United States Patent
Lin et al.

(10) Patent No.: US 8,718,573 B2
(45) Date of Patent: *May 6, 2014

(54) WIRELESS TRANSCEIVER APPARATUS HAVING CIRCUIT UNIT FORMING FREQUENCY RESONANCE MODE WHEN OPERATED UNDER RECEPTION MODE

(71) Applicant: Realtek Semiconductor Corp., HsinChu (TW)

(72) Inventors: Yi-Chieh Lin, Tainan (TW); Yu-Hsin Chen, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,235

(22) Filed: Nov. 18, 2013

(65) Prior Publication Data

US 2014/0073269 A1    Mar. 13, 2014

Related U.S. Application Data

(63) Continuation of application No. 13/175,891, filed on Jul. 4, 2011.

(30) Foreign Application Priority Data

Jul. 15, 2010   (TW) ............................. 99123281 A

(51) Int. Cl.
H04B 1/44   (2006.01)

(52) U.S. Cl.
USPC .............................................. 455/83; 455/78

(58) Field of Classification Search
USPC ................... 455/83, 575.7, 115.3, 134, 161.3, 455/226.2, 229, 60, 63.1, 67.11, 70, 73, 78, 455/82, 88
See application file for complete search history.

(56) References Cited

U.S. PATENT DOCUMENTS

| | | | | |
|---|---|---|---|---|
| 5,375,257 A | * | 12/1994 | Lampen | 455/83 |
| 7,373,115 B2 | | 5/2008 | Monroe | |
| 7,468,638 B1 | | 12/2008 | Tsai et al. | |
| 7,787,830 B2 | * | 8/2010 | Goddard et al. | 455/78 |
| 8,045,626 B2 | * | 10/2011 | Iwasaki | 375/257 |

(Continued)

OTHER PUBLICATIONS

Li, "5.8-GHz CMOS T/R Switches With High and Low Substrate Resistances in a 0.18-um CMOS Process", IEEE Microwave and Wireless Components Letters, vol. 13, No. 1, pp. 1-3, Jan. 2003.

(Continued)

Primary Examiner — Andrew Wendell
Assistant Examiner — Maryam Soltanzadeh
(74) Attorney, Agent, or Firm — McClure, Qualey & Rodack, LLP

(57) ABSTRACT

A wireless transceiver apparatus is provided. The wireless transceiver apparatus includes a signal transmitting circuit comprising an output port for outputting a transmission signal in a transmission mode, the signal transmitting circuit further comprising an inductive component. The wireless transceiver apparatus also includes a circuit unit coupled to the output port of the signal transmitting circuit, the circuit unit comprising a capacitive component and a signal receiving circuit comprising a receiving port for receiving a wireless communication signal in a reception mode. The output port is coupled to the receiving port, and the capacitive component in the circuit unit and the inductive component in the signal transmitting circuit form a resonator structure configured to operate in a frequency resonance mode during the reception mode.

20 Claims, 4 Drawing Sheets

(56) References Cited

U.S. PATENT DOCUMENTS

| | | | |
|---|---|---|---|
| 8,185,162 B2* | 5/2012 | Haskell et al. | 455/562.1 |
| 8,494,456 B2* | 7/2013 | Tanaka et al. | 455/73 |
| 2011/0045786 A1 | 2/2011 | Leinonen et al. | |

OTHER PUBLICATIONS

Yeh, "Design and Analysis for a Miniature CMOS SPOT Switch Using Body-Floating Technique to Improve Power Performance", IEEE Transactions on Microwave Theory and Techniques, vol. 54, No. 1, pp. 31-39, Jan. 2006.

* cited by examiner

WIRELESS TRANSCEIVER APPARATUS HAVING CIRCUIT UNIT FORMING FREQUENCY RESONANCE MODE WHEN OPERATED UNDER RECEPTION MODE

CROSS-REFERENCE TO RELATED APPLICATION

This application is a continuation application of co-pending U.S. patent application Ser. No. 13/175,891, filed Jul. 4, 2011, which claims the benefit of Taiwan application Serial No. 099123281, filed Jul. 15, 2010, the contents of which are incorporated herein by reference.

BACKGROUND OF THE INVENTION

1. Field of the Invention

The present invention relates to a wireless transmitting and receiving mechanism, and more particularly, to a wireless transceiver apparatus that shares an antenna module.

2. Description of the Prior Art

In a wireless communication system, a design of a transmitting/receiving switch (T/R switch) is mainly based on signal insertion loss during signal transmitting, signal isolation between a transmission signal and a reception signal and power handling capability. In practice, no matter whether the T/R switch is realized utilizing a ready-made product or other manner, the cost and the circuit board complexity should be taken into consideration. Therefore, in recent years, with the development of semiconductor process and the requirement of the cost, more and more products aim at having a power amplifier and a T/R switch integrated into one chip simultaneously. Regarding most of the designs having the T/R switch integrated therein, the principle thereof is to respectively control if a signal path of a transmitter end or a receiver end is conductive to determine a working mode. Please refer to FIG. 1, which is a circuit diagram illustrating a conventional apparatus 100 realized under the current technology for sharing an antenna module. The apparatus 100 includes two T/R switch components 101A and 101B, wherein the switch component 101A is coupled to the antenna module 105 and a power amplifier 110 (which is a circuit within the transmitter end), and the switch component 101B is coupled to the antenna 105 and a low-noise amplifier 115 (which is a circuit within the receiver end). The current technology utilizes a signal S_TR to control if the switch components 101A and 101B are conductive, wherein one of the signal paths has an inverter to make conductive statuses of the two switch components 101A and 101B different from each other.

However, since the transmission signal/reception signal will pass through the switch component 101A/101B, the parasitic effects resulted from the complementary metal-oxide-semiconductor (CMOS) process will still let the signal bear a certain loss even if the other working mode (e.g., a transmission mode) is disabled. As a result, the gain and linearity of the signal would be affected. The current method tries to decrease the signal leakage on the signal path, or change the parasitic resistance value of the substrate in a transistor. However, the significant effect of this conventional method is the greatly increased chip area. Thus, this method is only applicable to a circuit that transmits and receives narrowband signals. Therefore, a body floating technique is proposed to improve the power handling capability of the T/R switch. Since the power handling capability requires accurate control, an extra model for describing the power has to be developed, which increases the design time inevitably.

SUMMARY

Therefore, in order to solve the problem mentioned above, one of the objectives of the present invention is to provide a wireless transceiver apparatus that shares an antenna module, wherein the antenna module is not directly connected to a circuit at a transmitter end or a circuit at a receiver end via a switch component, and a wireless communication signal (e.g., a transmission signal or a reception signal) does not directly pass through the switch component. Therefore, such design is helpful to mitigating the signal loss and improving the signal isolation and power handling capability.

According to the exemplary embodiment of the present invention, an exemplary wireless transceiver apparatus is disclosed. The exemplary wireless transceiver apparatus includes a signal transmitting circuit, a circuit unit and a signal receiving circuit. The signal transmitting circuit includes a first output port utilized for outputting a transmission signal in a transmission mode. The circuit unit is coupled to the first output port of the signal transmitting circuit. The signal receiving circuit includes a first receiving port utilized for receiving a first wireless communication signal in the reception mode. The first output port is coupled to the first receiving port at a first node, and the circuit unit forms frequency resonance mode in the reception mode, thereby increasing an impedance value viewed from the first node into the signal transmitting circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
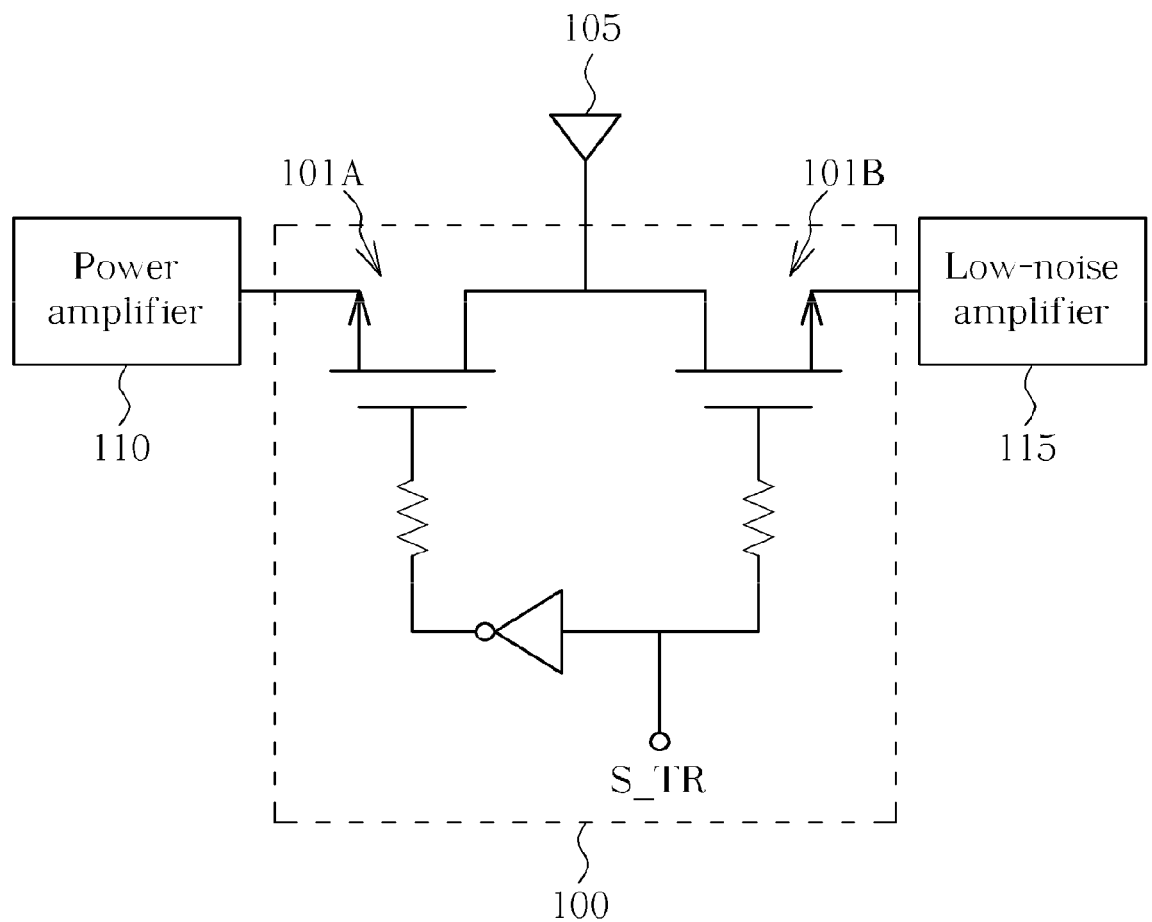
FIG. 1 is a diagram illustrating a conventional apparatus realized under the current technology for sharing an antenna module.
Figure 2:
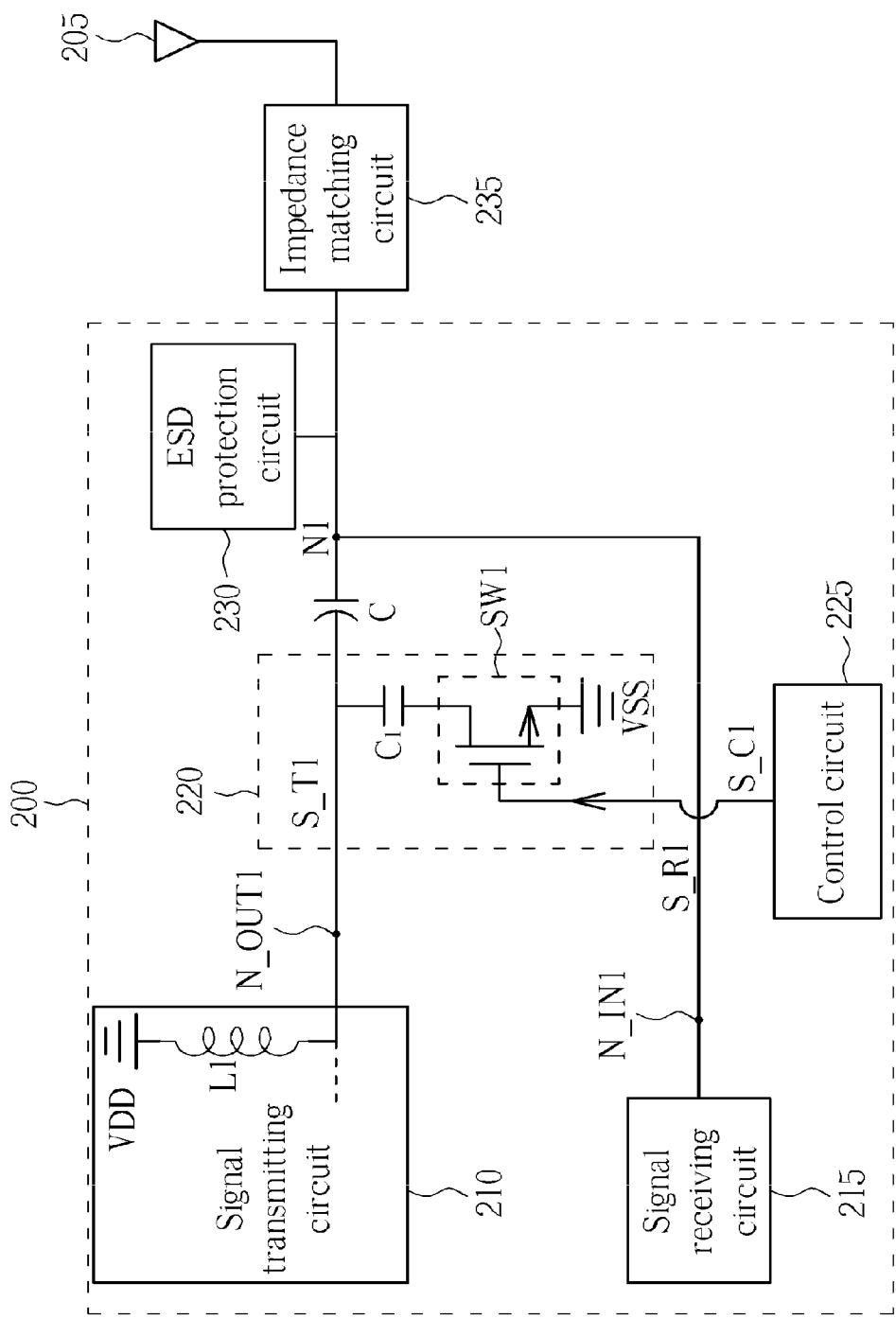
FIG. 2 is a diagram illustrating a wireless transceiver apparatus according to a first exemplary embodiment of the present invention.

Please refer to FIG. 2, which is a diagram illustrating a wireless transceiver apparatus 200 according to a first exemplary embodiment of the present invention. The wireless transceiver apparatus 200 is electrically connected to an antenna module 205 via an impedance matching circuit 235. The wireless transceiver apparatus 200 includes a node N1, a signal transmitting circuit 210 (e.g., a circuit including a power amplifier), a signal receiving circuit 215 (e.g., a circuit including a low-noise amplifier), a circuit unit 220, a control circuit 225 and an electrostatic discharge (ESD) protection circuit 230. The signal transmitting circuit 210 includes an output port N_OUT1 utilized for outputting a transmission signal S_T1 in the transmission mode. The circuit unit 220 is coupled to the output port N_OUT1 of the signal transmitting circuit 210. The signal receiving circuit 215 includes a receiving port N_IN1 utilized for receiving a wireless communication signal S_R1 in the reception mode. That is, the signal transmitting circuit 210 is used to generate single-ended output signals, and the signal receiving circuit 215 is utilized to receive single-ended input signals. No matter whether the wireless transceiver apparatus 200 stays in the transmission mode or the reception mode, the node N1 is coupled to both of the output port N_OUT1 of the signal transmitting circuit 210 and the receiving port N_IN1 of the signal receiving circuit 215. Besides, the circuit unit 220 forms a frequency resonance mode in the reception mode to thereby increase an impedance value viewed from the node N1 into the signal transmitting circuit 210. In other words, the frequency resonance characteristic may be utilized for increasing the impedance value viewed from the node N1 into the signal transmitting circuit 210 to be high impedance, thereby decreasing an effect contributed from the signal transmitting circuit 210 to the signal receiving circuit 215 in the reception mode. Additionally, utilizing the impedance matching circuit 235 to match the current input impedance of the whole wireless transceiver apparatus 200 may make the input signal of the wireless transceiver apparatus 200 flow into the receiving circuit 215 only.

More specifically, the circuit unit 220 includes a switch component SW1 and a capacitive component C1. The switch component SW1 includes a first end, a second end and a control end. The first end of the switch component SW1 is coupled to a reference potential (which is a ground potential VSS in this exemplary embodiment). The second end of the switch component SW1 is coupled to the capacitive component C1. The control circuit 225 generates a control signal S_C1 to the control end of the switch component SW1 to control if the switch component SW1 is conductive. The signal transmitting circuit 210 includes an inductive component L1. The inductive component L1 includes a first end and a second end. The first end of the inductive component L1 is coupled to the output port N_OUT1 of the signal transmitting circuit 210, and the second end of the inductive component L1 is coupled to another reference potential (which is a power supply potential VDD in this exemplary embodiment). As to an alternating current (AC) signal, the power supply potential VDD is regarded as ground. Moreover, the conductive component C1 is coupled to the second end of the switch component SW1 and the first end of the inductive component L1. That is, the capacitive component C1 is electrically connected to the output port N_OUT1 of the signal transmitting circuit 210.

When the wireless transceiver apparatus 200 is operated under the reception mode, the signal transmitting circuit 210 is disabled, and the signal receiving circuit 215 is enabled to receive the wireless communication signal S_R1 from the antenna module 205. The control circuit 225 outputs the control signal S_C1 to control the switch component SW1 to be conductive such that the inductive component C1 is coupled to the ground potential VSS via the switch component SW1. In accordance with the design of this exemplary embodiment, the capacitive component C1 and the inductive component L1 form an LC resonator structure with frequency resonance. During the frequency resonance, the input impedance viewed from the node N1 into the signal transmitting circuit 210 is increased to be high impedance. Due to the high impedance, the AC coupled capacitor C will not affect the signal of the signal receiving circuit 215. In this way, the influence contributed from the disabled signal transmitting circuit 210 to the enabled signal receiving circuit 214 may be reduced effectively. The AC coupled capacitor C is utilized for acting as impedance matching required by the signal transmitting circuit 210 to transmit signals when the wireless transceiver apparatus 200 is operated under the transmission mode. However, it is not meant to be a limitation to the present invention. The AC coupled capacitor C in this exemplary embodiment is an optional component. So, by properly adjusting the capacitance value of the capacitive component C1, the capacitive component C1 may resonate with the inductive component L1 of the signal transmitting circuit 210 in the transmission mode, wherein the resonance frequency $$\left( f = \frac{1}{2\pi\sqrt{LC}} \right)$$

is configured to be equal to the operational frequency such that high impedance is formed under circuit's operational frequency to thereby avoid the signal loss by guiding the wireless communication signal S_R1 to the signal receiving circuit 215 rather than the signal transmitting circuit 210. On the contrary, if this resonance capacitor (i.e., the capacitive component C1) is not disposed in the circuit, part of the signal will directly flow into the signal transmitting circuit 210 via the inductive component L1 during signal reception, and causes signal loss which affects gain of the signal receiving circuit.

Moreover, when the wireless transceiver apparatus 200 is operated under the transmission mode, the signal receiving circuit 215 is disabled, and the signal transmitting circuit 210 is enabled to output the transmission signal to the antenna module 205. The control circuit 115 outputs the control signal S_C1 to control the switch component SW1 to be non-conductive such that the capacitive component C1 is disconnected from the ground and stays in a floating status. Therefore, the capacitive component C1 will not affect the signal quality of the transmission signal S_T1 output by the signal transmitting circuit 210. In addition, the signal path between the antenna module 205 and the signal transmitting circuit 210 and the signal path between the antenna 205 and the signal receiving circuit 215 in this exemplary embodiment may have extra capacitive components disposed thereon to perform AC coupling upon a signal (e.g., the transmission signal S_T1 or the wireless communication signal S_R1). Besides, as shown in FIG. 2, there is no active components (e.g., switch components) disposed on the two signal paths. That is, active components are not connected to the signal transmitting circuit 210/signal receiving circuit 215 via a series connection with the signal transmitting path or the signal receiving path. Therefore, the transmitted transmission signal S_T1 or wireless communication signal S_R1 will not encounter the signal loss problem caused by transmitting signals through active components. Compared with the prior art, the signal gain and linearity in this exemplary embodiment may be improved. Besides, since this exemplary embodiment may only utilize a switch component SW1, realized by a capacitive component C1 and a transistor, to resonate with the inductive component L1 of the signal transmitting circuit 210 for achieving the objective of decreasing signal loss and improving gain and linearity. Compared with the prior art, an actual implementation of the present embodiment requires fewer components of a circuit board to thereby effectively avoid occupying an area of the chip. This is helpful to decreasing the production cost. Moreover, the ESD protection circuit 230 further included in the wireless transceiver apparatus 200 may perform ESD protection upon the circuit components included in the wireless transceiver apparatus 200.

Figure 3:
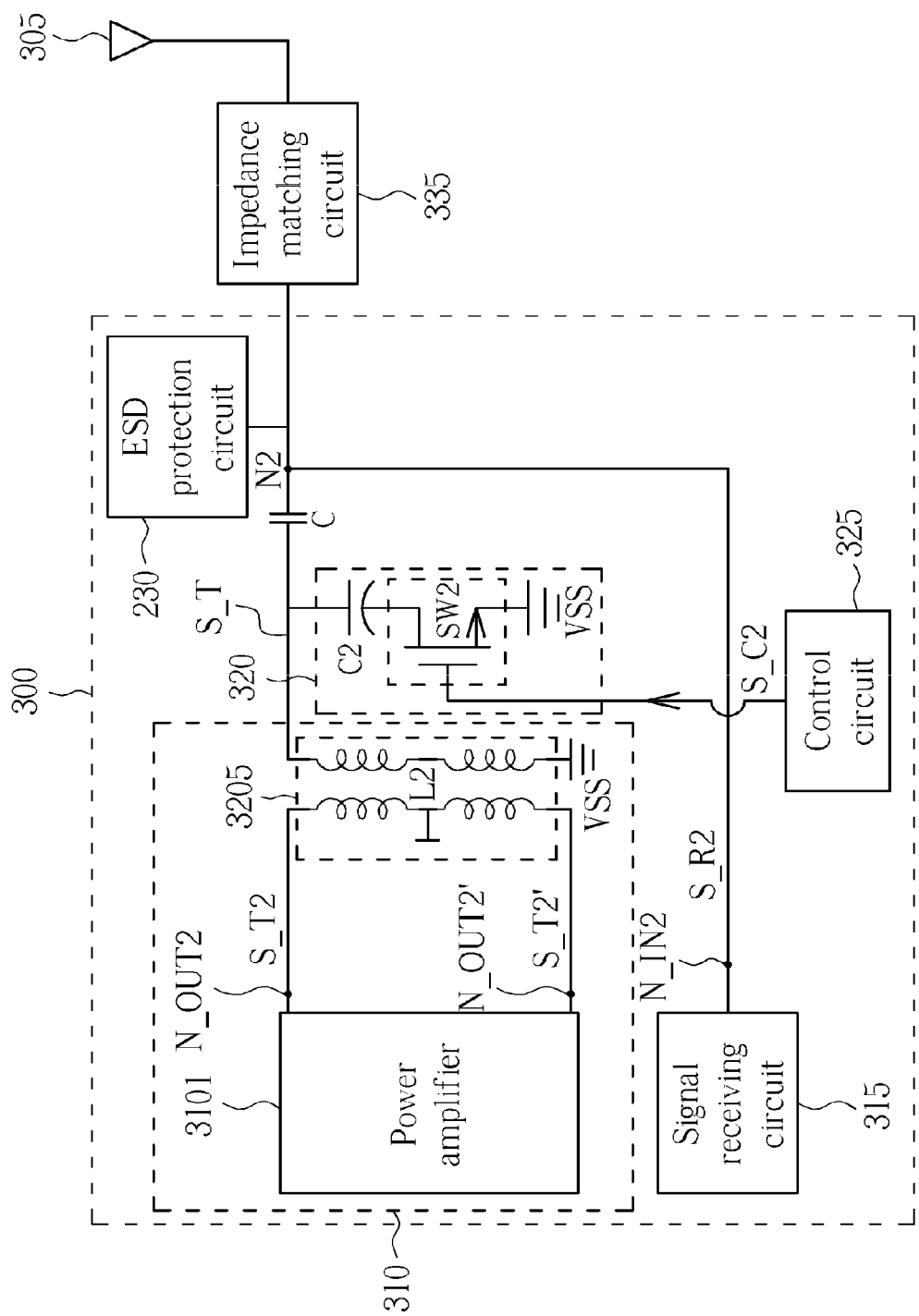
FIG. 3 is a diagram illustrating a wireless transceiver apparatus according to a second exemplary embodiment of the present invention.

Moreover, the spirit of the present invention may also be applied to a signal transmitting circuit utilized for outputting a transmission signal being a differential signal. Please refer to FIG. 3, which is a diagram illustrating a wireless transceiver apparatus 300 according to a second exemplary embodiment of the present invention. The wireless transceiver apparatus 300 is coupled to the antenna module 305 via the impedance matching circuit 335, and includes a node N2, a signal transmitting circuit 310 which generates a single-ended transmission signal S_T (e.g., a circuit including a power amplifier 3101), a signal receiving circuit 315 (e.g., a circuit including a low-noise amplifier), a circuit unit 320, a control circuit 325 and an electrostatic discharge (ESD) protection circuit 330. The power amplifier 3101 of the signal transmitting circuit 310 includes a first output port N_OUT2 and a second output port N_OUT2', and outputs a first differential signal via the first output port N_OUT2 and a second differential signal S_T2' via the second output port N_OUT2' in a transmission mode, wherein the two differential signals S_T2 and S_T2' form a differential transmission signal pair. Besides, the signal transmitting circuit 310 further includes a balun 3205, which is coupled to the power amplifier 3101 and has two input ports and an output port. The two input ports of the balun 3205 are respectively connected to the two output ports N_OUT2, N_OUT2' of the power amplifier 3101, and the output port of the balun 3205 is connected to the node N2 and the circuit unit 320. The balun 3205 is utilized for receiving differential transmission signals S_T2 and S_T2' via its two input ports, converts the differential transmission signal pair, including S_T2 and S_T2', into a single-ended transmission signal S_T, and outputs the single-ended transmission signal S_T to the node N2 and the circuit unit 320 via its output port. Besides, the circuit unit 320 is coupled to the output port of the balun 3205, and includes a capacitive component C2 and a switch component SW2. The circuit unit 320 includes a first end coupled to the output port of the balun 3205, and a second end coupled to a reference potential (e.g., a ground potential VSS), wherein the circuit unit 320 couples the first end to the second end in the reception mode, and disconnects the first end from the second end in the transmission mode. More specifically, the switch component SW2 includes a first end, a second end and a control end. The first end of the switch component SW2 is coupled to the ground potential VSS, and the second end of the switch component SW2 is coupled to the capacitive component C2. The control circuit 325 outputs a control signal S_C2 to the control end of the switch component SW2 to control if the switch component SW2 is conductive. The capacitive component C2 is coupled between the second end of the switch component SW2 and a connection node between the balun 3205 and the antenna module 305.

When the wireless transceiver apparatus 300 is operated under a reception mode, the signal transmitting circuit 310 is disabled, and the signal receiving circuit 315 is enabled to receive a wireless communication signal S_R2 from the antenna module 305. The control circuit 325 outputs the control signal S_C2 to control the switch component SW2 to be conductive. The inductive component C2 is coupled to the ground potential VSS via the switch component SW2. At this moment, the capacitive component C2 and the inductive component L2 in a coil of the balun 3205 form an LC resonator structure with frequency resonance. During the frequency resonance, the input impedance viewed from the node N2 into the signal transmitting circuit 310 is increased to be high impedance. Due to the high impedance, the AC coupled capacitor C will not affect the signal of the signal receiving circuit 315. In this way, the influence contributed from the disabled signal transmitting circuit 210 to the signal receiving circuit 315 may be reduced effectively. The AC coupled capacitor C is utilized for acting as impedance matching required by the signal transmitting circuit 310 to transmit signals when the wireless transceiver apparatus 300 is operated under the transmission mode. The frequency resonance operation of the wireless transceiver apparatus 300 and the related theory are similar to the operation of the wireless transceiver apparatus 200, so it is omitted here for brevity.

Moreover, when the wireless transceiver apparatus 300 is operated under the transmission mode, the signal receiving circuit 315 is disabled, and the signal transmitting circuit 310 is enabled to output the differential signals S_T2 and S_T2' to the balun 3205 to generate a single-ended transmission signal S_T. The control circuit 325 outputs a control signal S_C2 to control the switch component SW2 to be non-conductive, such that the capacitive component C2 is disconnected from the ground and stays in a floating status. Therefore, the capacitive component C2 will not affect the signal quality of the single-ended transmission signal S_T output by the signal transmitting circuit 310. In this exemplary embodiment, the balun 3205 converts double-ended differential outputs S_T2 and S_T2' of the power amplifier 3101 into a single-ended output S_T, and the signal receiving circuit 315 is configured in a single-in differential-out structure, which may save an off-chip balun and reserve the common-mode noise filtering characteristic of a differential circuit structure. Besides, considering that the sensitivity of the whole signal receiving circuit 315 may be affected due to the high signal loss of the balun 3205 which may greatly increase a noise figure of the low-noise amplifier in the signal receiving circuit 315, the manner of converting a single-ended input signal into double-ended differential outputs via a balun is not employed in this exemplary embodiment.

Figure 4:
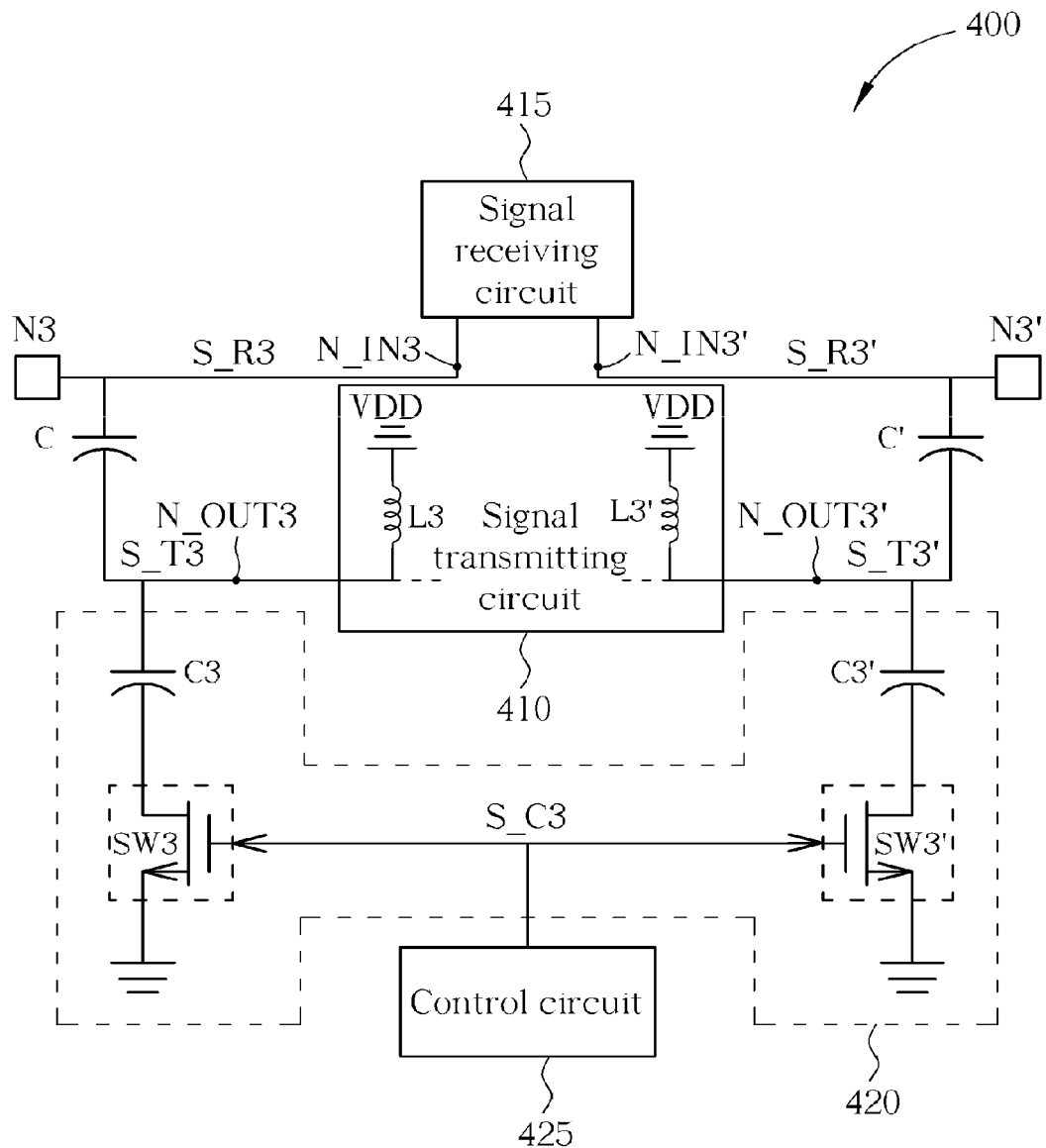
FIG. 4 is a diagram illustrating a wireless transceiver apparatus according to a third exemplary embodiment of the present invention.

Moreover, the spirit of the present also may be applied to a signal transmitting circuit that outputs differential signals and a signal receiving circuit that receives differential signals. Please refer to FIG. 4, which is a diagram illustrating a wireless transceiver apparatus 400 according to a third exemplary embodiment of the present invention. The wireless transceiver apparatus 400 is coupled to an antenna module (not shown in FIG. 4), and includes nodes N3, N3', a signal transmitting circuit 410 capable of generating differential output signals (e.g., a circuit including a power amplifier), a signal receiving circuit 415 capable of receiving differential input signals (e.g., a circuit including a low-noise amplifier), a circuit unit 420 and a control circuit 425. The operation and function of the signal transmitting circuit 410 are similar to that of the signal transmitting circuit 310 shown in FIG. 3. The first output port N_OUT3 and the second output port N_OUT3' of the signal transmitting circuit 410 are respectively coupled to the nodes N3 and N3', and the signal transmitting circuit 410 includes a first inductive component L3 and a second inductive component L3' both coupled to a power supply potential VDD. As to an AC signal, the power supply potential VDD is regarded as ground. The signal transmitting circuit 410 outputs a differential transmission signal pair, including S_T3 and S_T3', to the nodes N3 and N3' via the two output ports N_OUT3 and N_OUT3' in the transmission mode, and transmits the differential transmission signal pair to the antenna module. The signal receiving circuit 415 includes a first receiving port N_IN3 and a second receiving port N_IN3' respectively coupled to the nodes N3 and N3', wherein the signal receiving circuit 415 receives a differential wireless communication signal pair, including the first wireless communication signal S_R3 and the second wireless communication signal S_R3', via the first receiving port N_IN3 and the second receiving port N_IN3' in the reception mode. The circuit unit 420 is coupled to the two output ports N_OUT3 and N_OUT3' of the signal transmitting circuit 410, and includes two circuit groups used for forming frequency resonance in the reception mode. The first circuit group is coupled to the output port N_OUT3 and includes a first switch component SW3 and a first capacitive component C3. The second circuit group is coupled to the output port N_OUT3' and includes a second switch component SW3' and a second capacitive component C3'.

When the wireless transceiver apparatus 400 is operated under the reception mode, the signal transmitting circuit 410 is disabled, and the signal receiving circuit 415 is enabled to receive wireless communication signals S_R3 and S_R3' from the antenna module. The control circuit 425 outputs the control signal S_C3 to control the switch components SW3 and SW3' to be conductive. The inductive component C3 is coupled to the ground potential VSS via the switch component SW3, and the capacitive component C3' is coupled to the ground potential VSS via the switch component SW3'. At this moment, the capacitive component C3 and the inductive component L3 form one LC resonator structure with frequency resonance, and the capacitive component C3' and the inductive component L3' form another LC resonator structure with frequency resonance. The theory and operation of the frequency resonance of the wireless transceiver apparatus 400 are similar to the operation of the wireless transceiver apparatus 200 shown in FIG. 2. To avoid lengthy specification, further description is omitted here for brevity.

Moreover, when the wireless transceiver apparatus 400 is operated under the transmission mode, the signal receiving circuit 415 is disabled, and the signal transmitting circuit 410 is enabled to output a differential transmission signal pair, including S_T3 and S_T3', to the nodes N3 and N3' for transmitting the differential transmission signal pair to the antenna module. The control circuit 425 outputs a control signal S_C3 to control the switch components SW3 and SW3' to be non-conductive, such that the capacitive components C3 and C3' are both disconnected from the ground and stay in the floating status. In this way, the capacitive components C3 and C3' will not affect the signal quality of the transmission signals output by the signal transmitting circuit 410.

Briefly summarized, one operational characteristic of the wireless transceiver apparatuses 200, 300, 400 in the aforementioned exemplary embodiments of the present invention is that there is no T/R switch component (which is an active component) directly disposed on the signal transmission path or the signal reception path of the wireless transceiver apparatus. In other words, the signal is not directly transmitted through the T/R switch component. Thus, the active component will not be connected to the signal transmitting circuit or the signal receiving circuit in the aforementioned exemplary embodiments via a series connection with a signal transmission path or a signal receiving path. The transmitted transmission signal or the wireless communication signal will not encounter the signal loss problem caused by transmitting signals through the active components.

Those skilled in the art will readily observe that numerous modifications and alterations of the device and method may be made while retaining the teachings of the invention.

At least the following is claimed:

1. A wireless transceiver apparatus, comprising:
    a signal transmitting circuit comprising an output port for outputting a transmission signal in a transmission mode, the signal transmitting circuit further comprising an inductive component;
    a circuit unit coupled to the output port of the signal transmitting circuit, the circuit unit comprising a capacitive component; and
    a signal receiving circuit comprising a receiving port for receiving a wireless communication signal in a reception mode;
    wherein the output port is coupled to the receiving port, and wherein the capacitive component in the circuit unit and the inductive component in the signal transmitting circuit form a resonator structure configured to operate in a frequency resonance mode during the reception mode.

2. The wireless transceiver apparatus of claim 1, wherein the signal transmitting circuit and the signal receiving circuit are coupled to a common antenna module.

3. The wireless transceiver apparatus of claim 2, wherein the signal transmitting circuit and the signal receiving circuit are coupled to the common antenna module via an impedance matching circuit.

4. The wireless transceiver apparatus of claim 1, wherein the circuit unit further comprises a switch component comprising a first end, a second end and a control end, the first end of the switch component being coupled to a reference potential.

5. The wireless transceiver apparatus of claim 4, wherein the switch component comprises a transistor, and wherein the reference potential comprises a ground potential.

6. The wireless transceiver apparatus of claim 4, wherein in the reception mode, the switch component is placed in a conductive state such that the capacitive component resonates with the inductive component.

7. The wireless transceiver apparatus of claim 4, wherein in the transmission mode, the switch component is placed in a non-conductive state such that the capacitive component operates in a floating status.

8. The wireless transceiver apparatus of claim 1, further comprising a coupling capacitor connected between the signal transmitting unit and the signal receiving circuit.

9. A wireless transceiver apparatus, comprising:
    a signal transmitting circuit comprising an output port for outputting a single-ended transmission signal to an antenna module in a transmission mode;
    a circuit unit coupled to the output port of the signal transmitting circuit, the circuit unit comprising a capacitive component; and
    a signal receiving circuit comprising a receiving port for receiving a wireless communication signal via the antenna module in a reception mode;
    wherein the output port is coupled to the receiving port at a node, and wherein the capacitive component in the circuit unit and an inductive component of a balun in the signal transmitting circuit form a resonator structure that operates in a frequency resonance mode during the reception mode.

10. The wireless transceiver apparatus of claim 9, wherein the signal receiving circuit is configured as a single-in-differential-out circuit.

11. The wireless transceiver apparatus of claim 9, wherein the signal transmitting circuit further comprises an output power amplifier configured to generate a differential transmission signal pair, and wherein the signal receiving circuit comprises an input low-noise amplifier.

12. The wireless transceiver apparatus of claim 11, wherein the balun is configured to convert the differential transmission signal pair into the single-ended transmission signal and output the single-ended transmission signal via the output port.

13. The wireless transceiver apparatus of claim 9, further comprising a control circuit configured to output a control signal in the reception mode to place the switch component in a conductive state such that the capacitive component resonates with the inductive component.

14. The wireless transceiver apparatus of claim 13, wherein in the transmission mode, the control circuit is configured to output the control signal to place the switch component in a non-conductive state such that the capacitive component operates in a floating status.

15. The wireless transceiver apparatus of claim 9, wherein the circuit unit further comprises a switch component comprising a first end, a second end and a control end, the first end of the switch component being coupled to a reference potential.

16. The wireless transceiver apparatus of claim 15, wherein the switch component comprises a transistor, and wherein the reference potential comprises a ground potential.

17. The wireless transceiver apparatus of claim 9, further comprising a coupling capacitor connected between the signal transmitting unit and the signal receiving circuit.

18. A wireless transceiver apparatus, comprising:
a signal transmitting circuit comprising an output port for outputting a transmission signal in a transmission mode, the signal transmitting circuit further comprising an inductive component;
a circuit unit coupled to the output port of the signal transmitting circuit, the circuit unit comprising a capacitive component coupled to a switch component; and
a signal receiving circuit comprising a receiving port for receiving a wireless communication signal in a reception mode;
wherein the output port is coupled to the receiving port, and wherein the capacitive component in the circuit unit and the inductive component in the signal transmitting circuit form a resonator structure, wherein the resonator structure and the switch component are configured to decrease interference from the signal transmitting circuit to the signal receiving circuit during the reception mode, wherein no active components are connected to the signal transmitting circuit via a series connection with a signal transmitting path, and wherein no active components are connected to the signal receiving circuit via a series connection with a signal receiving path.

19. The wireless transceiver apparatus of claim 4, wherein in the reception mode, the switch component is placed in a conductive state such that the capacitive component resonates with the inductive component.

20. The wireless transceiver apparatus of claim 4, wherein in the transmission mode, the switch component is placed in a non-conductive state such that the capacitive component operates in a floating status.

* * * * *